United States Patent [19]
Carpi et al.

[11] Patent Number: 5,788,039
[45] Date of Patent: Aug. 4, 1998

[54] CLUTCH COVER AND CLUTCH COMPRISING SUCH A COVER

[75] Inventors: Jean-Pierre Carpi, Toutencourt; Raymond Hagnere, Amiens, both of France

[73] Assignee: Valeo, Paris, France

[21] Appl. No.: 617,788

[22] PCT Filed: Jul. 11, 1995

[86] PCT No.: PCT/FR95/00928

§ 371 Date: Mar. 22, 1996

§ 102(e) Date: Mar. 22, 1996

[87] PCT Pub. No.: WO96/03590

PCT Pub. Date: Feb. 8, 1996

[30] Foreign Application Priority Data

Jul. 25, 1994 [FR] France ................ 94 09273

[51] Int. Cl.[6] ...................... F16D 13/58
[52] U.S. Cl. .............. 192/89.23; 192/112; 411/447; 411/501
[58] Field of Search .............. 192/89.23, 70.27, 192/112; 411/447, 448, 501, 506

[56] References Cited

U.S. PATENT DOCUMENTS

| 2,695,688 | 11/1954 | Wollpert et al. |
| 2,777,496 | 1/1957 | Kahn . |
| 3,958,389 | 5/1976 | Whiteside et al. ............. 411/504 X |
| 4,069,905 | 1/1978 | De Gennes ............. 192/89.23 X |
| 4,751,991 | 6/1988 | Naudin ............. 192/70.27 X |

FOREIGN PATENT DOCUMENTS

| 0549987 | 8/1956 | Belgium . |
| 2585424 | 1/1987 | France . |
| 2688557 | 9/1993 | France ............. 192/89.23 |
| 2156920 | 10/1985 | United Kingdom . |

Primary Examiner—Rodney H. Bonck
Assistant Examiner—Saúl J. Rodríguez
Attorney, Agent, or Firm—Longacre & White

[57] ABSTRACT

A clutch cover having balancing holes (31) for fixing a balancing device. At least one recess (32) is formed in the cover adjacent to one of the balancing holes (31) wherein the recess reduces the local thickness of the cover plate.

7 Claims, 3 Drawing Sheets

1

CLUTCH COVER AND CLUTCH COMPRISING SUCH A COVER

BACKGROUND OF THE INVENTION

1. Field of the Invention

The present invention relates to cover plates for clutch mechanisms, especially for motor vehicles, and to clutch mechanisms including such a cover plate, as is described for example in the document FR-A-2 585 424.

2. Description of the Prior Art

As is known, a clutch mechanism includes a unitary assembly of annular components, namely a cover plate, a pressure plate which is usually a casting, and axially acting resilient means which usually consist of a diaphragm.

The cover plate is adapted to be attached on a reaction plate which, in its application to motor vehicles, is arranged to be fixed on the crankshaft of the engine of the vehicle. The pressure plate offers a friction face for a clutch friction wheel which, in a motor vehicle, is mounted on the input shaft of the gearbox for rotation with it.

The clutch is accordingly a rotating component, and for this reason it is necessary to balance it dynamically. This dynamic balancing is usually obtained by means of holes formed in the pressure plate. Such a solution is not entirely satisfactory because it leads to the occurrence of hot spots in the region of the said holes.

For this reason it is preferable to carry out the said balancing with the aid of balancing members, such as balancing rivets which are fitted in holes formed in advance in the cover plate. Thus, with the aid of a machine it is possible to determine the location at which the said balancing member or members are to be fitted.

In order to obtain fine balancing, piercing of the balancing member or members can be considered. A result of this can be that, during the piercing operation, the balancing member is caused to rotate, and this is detrimental to its fastening on the cover plate.

An object of the present invention is to mitigate this drawback in a simple and inexpensive way, and accordingly to provide novel means which will enable rotation of the balancing member to be prevented.

SUMMARY OF THE INVENTION

According to the invention, a cover plate for a clutch mechanism of the type defined above is characterised in that at least one rebate is formed in the cover plate in the vicinity of a fastening hole for the balancing member, and in that the rebate consists of a recess which reduces the local thickness of the cover plate.

Thanks to the invention, during fastening of the balancing member, some of the material of the said member is able to penetrate into the said rebate in such a way that the balancing member is prevented from rotating by mating cooperation. It is therefore possible to pierce the balancing member subsequently without any risk of the latter becoming dislodged.

Accordingly, the recess does not extend from one side of the cover plate to the other, so that while the balancing member is being upset, the resulting flow of material is more closely controlled. In addition, the cover plate retains its rigidity.

To this end, the balancing member is preferably fitted on the cover plate by carrying out an upsetting operation. The said member preferably consists of a balancing rivet with a head of tubular form, which is adapted to be pierced in order to obtain fine balancing.

Preferably, the recesses are of oblong form and are open at one of their ends radially into the hole in the balancing member.

In order to enhance the blockage against rotation, a plurality of rebates or recesses are preferably formed in the vicinity of the hole in which the balancing member is fastened. These recesses or rebates may be in a form like that of petals projecting from a heart, which is constituted by the fastening hole.

In accordance with the invention, a clutch mechanism of the type defined above is characterised in that it includes a cover plate according to the invention.

The following description illustrates the invention with reference to the attached drawings, in which:

DETAILED DESCRIPTION OF THE PREFERRED EMBODIMENT

Figure 1:
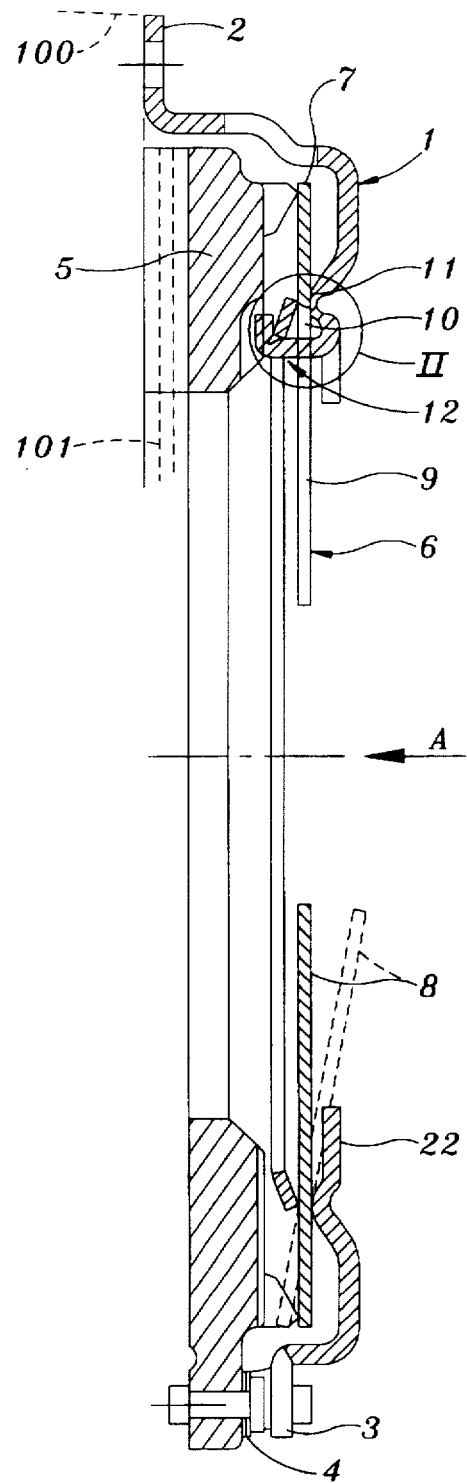
FIG. 1 is a view in axial cross section of a clutch mechanism in accordance with the invention.
Figure 2:
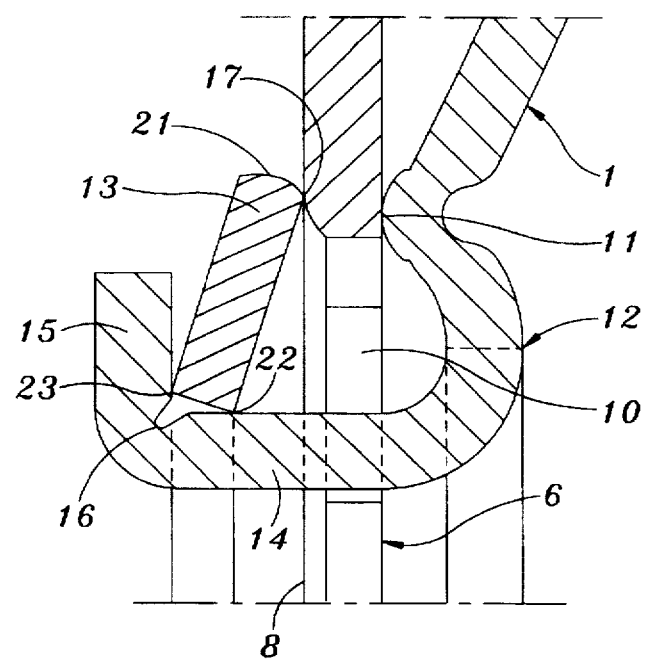
FIG. 2 is a view on a larger scale of a detail of FIG. 1, corresponding to the box 11 in FIG. 1.

FIGS. 1 and 2 show a diaphragm clutch mechanism for motor vehicles. In FIG. 1, the reaction plate and the clutch friction wheel which are included in a clutch are shown diagrammatically at 100 and 101 respectively. In the known manner, a clutch for a motor vehicle comprises a reaction plate 100, a clutch friction wheel 101, and a clutch mechanism which includes a unitary assembly consisting of annular components, namely: a cover plate 1 which is typically a component press-formed from sheet metal, a pressure plate 5, which is usually a casting, and axially acting resilient means 6.

In this example, the resilient means 6 consist of a diaphragm, while the cover plate 1, which is in the form of a hollow dish, includes a base portion which is orientated generally transversely and which has a central through aperture. The said base portion is extended at its outer periphery by a skirt portion, which in this example surrounds the diaphragm 6 and the pressure plate 5. The said skirt portion is itself extended by a generally transversely orientated flange that extends radially away from the axis of the assembly.

This flange accordingly defines the outer periphery of the cover plate 1, and includes a first set of coplanar portions through which it is arranged to be fixed on the reaction plate 100. The said flange also has a second set of coplanar portions 3, which are displaced axially back with respect to the portions 2, and by means of which it is attached to the pressure plate 5, in a manner known per se, by means of resilient tongues 4, which in this example are orientated tangentially, the pressure plate being thus coupled to the cover plate but with freedom to move axially.

Figure 3:
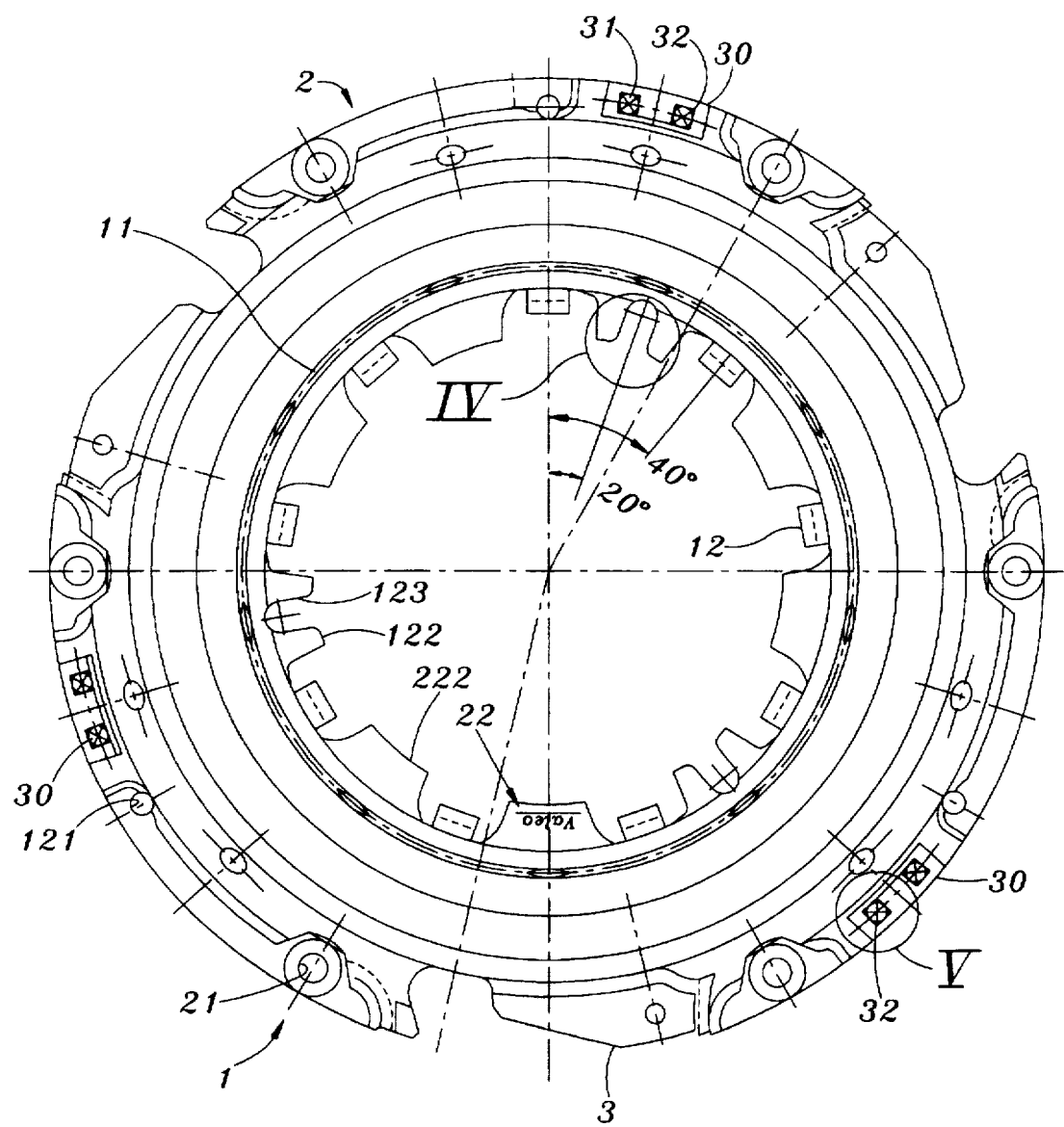
FIG. 3 is a view in elevation of a cover plate in accordance with the invention.
Figure 4:
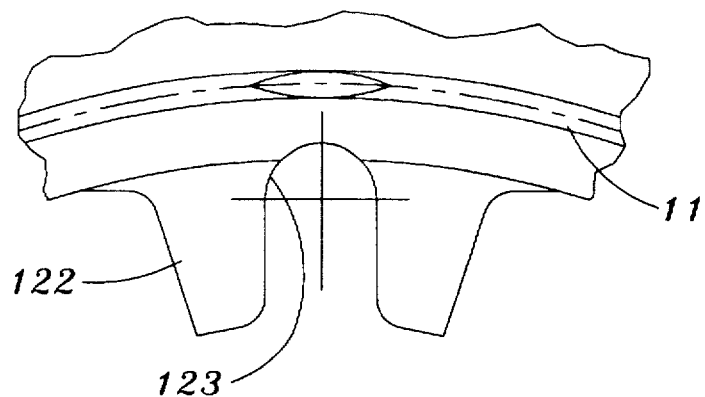
FIG. 4 is a view on an enlarged scale showing a detail of FIG. 3 corresponding to the box IV in FIG. 3.

In this example, the portions 2 include holes 21, 121 (FIG. 3), through which there pass, respectively, the fastening member by which the cover plate 1 is secured to the reaction plate 100, and centring pins carried by the reaction plate 100. The portions 3 are also formed with through holes for mounting return tongues 4 which are fixed, by means of fastening members, at one of their ends to radial lugs of the plate 5, and at their other ends to the portions 3 through the said holes.

The diaphragm 6 has a peripheral portion in the form of a Belleville ring 7, and a central portion which is divided into radial fingers 8 by means of slots 9. In this example widened passages 10 are formed between the fingers 8 at the radial level of the root zone where the fingers 8 join the ring 7. The diaphragm has a frusto-conical form in the free state. The outer periphery of the Belleville ring 7 acts on a divided annular projecting element (not given a reference numeral in FIG. 1) of the pressure plate 5, while the inner periphery of the said ring 7 bears on a primary abutment 11, which in this example is defined by a press-formed projecting element which is formed in the base portion of the press-formed sheet metal cover plate 1.

The clutch is normally in its engaged condition, and the diaphragm 6 bears on the projecting element 11 so as to act on the projecting element of the pressure plate 5, in order to grip the friction liners of the clutch friction wheel 101 between the pressure and reaction plates. In order to disengage the clutch, it is necessary to exert a thrust on the ends of the fingers 8, in the direction of the arrow A in FIG. 1, by means of a clutch release bearing (not shown), so as to cause the diaphragm to deflect and to cause it to cease acting on the pressure plate 5.

The tongues 4 thus urge the plate 5 towards the base portion of the cover plate 1. For this purpose, the diphragm 6 is mounted for pivoting movement on the cover plate 1, by assembly means which apply the diaphragm pivotally to the cover plate. In this example, these means include the primary abutment 11 mentioned above, together with fastening lugs 12 and a frusto-conical crown 13. The lugs 12 project integrally from the base portion of the cover plate, being formed by stamping and bending, and in the present case they are arranged alternately with abutment lugs 22 which are orientated generally transversely.

Some of the abutment lugs, namely the lugs 122, are formed with notches 123 so as to define a locating element. As can be seen in the lower part of FIG. 1, the fingers 8 engage on the lugs 22 when the clutch mechanism is not fixed on the reaction plate 100. After the mechanism has been so fixed, the diaphragm 6 is generally flat when the clutch friction wheel 101 is new.

In a manner known per se, the fastening lugs 12 include an axial portion 14 which passes through the passages 10 in the diaphragm, together with a radial terminal wing portion 15 which is bent radially away from the axis of the assembly along a line of weakening 16 (FIG. 2), so as to define a locating bend, and this enables the crown 3 to be mounted between the diaphragm 6 and the wing portion 15. The periphery of the crown 13 offers a secondary abutment 17 to the diaphragm 6, in alignment with the primary abutment 11.

The abutment 17 is formed on a rounded outer edge 21 of the crown 13, which has at its inner periphery edges 22, 23 in contact with the portion 14 and the wing portion 15 respectively. A rounded zone joins the projecting element 11 to the axial portion 14 of the lugs 12. The diaphragm is thus mounted pivotally between the said abutments 17 and 11, and during disengagement of the clutch, the diaphragm 6 bears on the secondary abutment 17, which in this example is elastic.

Having regard to the foregoing, it will be noted that the clutch mechanism constitutes a rotatable unitary assembly which must be dynamically balanced, for safety reasons in particular. To this end, the cover plate 1 is formed with holes 31, referred to as balancing holes, for the fitting and fastening of balancing members 132.

Figure 6:
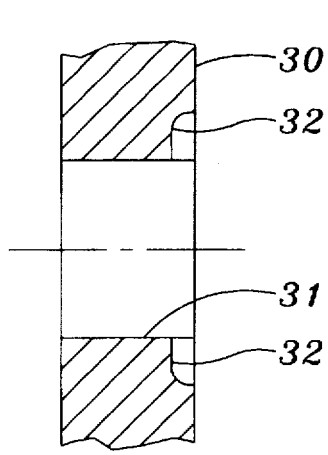
FIG. 6 is a partial view, in cross section taken on the line VI—VI in FIG. 5.
Figure 5:
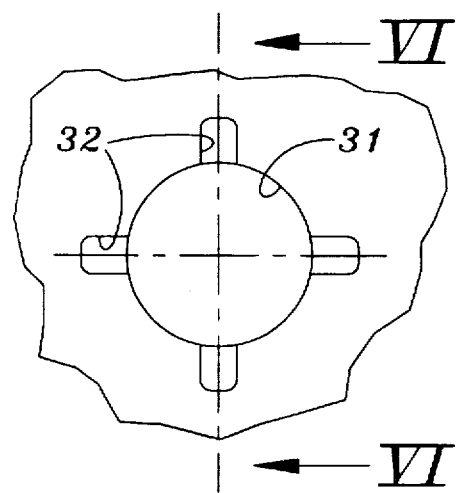
FIG. 5 is a view on an enlarged scale of a detail of FIG. 3, corresponding to the box V in FIG. 3.

In accordance with the invention, a cover plate of the type described above is characterised in that it has at least one rebate 32 formed in the vicinity of a balancing hole 31, and in that the rebate consists of a recess which reduces the local thickness of the cover plate. The rebate 32 is oblong in shape, and is open radially at one of its ends into the aperture or hole 31. The other end of the rebate 32 is of semicircular form (FIG. 6). In a modified version, this end may be inclined.

In this example, each hole 31 has four rebates 32. These rebates are spaced apart circumferentially at regular intervals of 90 degrees with respect to each other. The rebates thus extend generally radially, with two pairs of diametrically opposed rebates. In this example, the holes 31 are formed in the outer peripheral flange of the cover plate. The holes 31 are formed in coplanar portions 30 of the flange, which are offset axially with respect to the above mentioned portions 2 and 3. These portions 30 are in this example spaced apart by 120 degrees with respect to each other, with each portion 30 having two holes 31, with their rebates 32, for the fitting of balancing members 132. In this example these members 132 consist of rivets.

Figure 7:
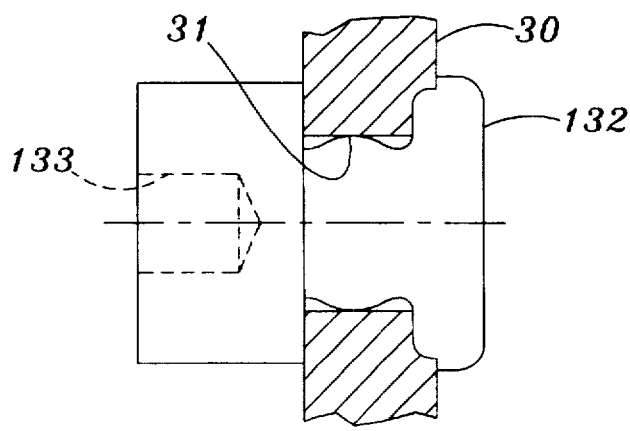
FIG. 7 is a view similar to FIG. 6, with a balancing member fitted.

As will have been understood, during the fastening, by upsetting, of the rivet 132 in one of the holes 31, the material of the said rivet is caused to flow and thus to fill the rebates 32, which are preferably shallow, so that a mating cooperation is obtained between the rivet and the cover plate, thus preventing rotation of the rivet in the cover plate as can be seen in FIG. 7, in which the deformation which the tail of the rivet 132 undergoes during the upsetting operation is exaggerated.

The said rivet has a cylindrical head, which in this example is in the form of a boss. The invention makes it possible to pierce this head, at 133, so as to provide fine adjustment for the balancing of the mechanism using a balancing machine, which selects the hole or holes 31 in which the rivet or rivets 132 are to be fitted. These rivets 132 may accordingly be pierced after having been fitted, without any risk of rotation.

The balancing rivets 132 are thus firmly secured, and there is no need to modify the tooling in any significant way for manufacture of the cover plate.

The present invention is of course not limited to the embodiment described, and in particular the fastening holes for the balancing members may be formed, for example, in the coplanar portions 3, or, in a modified version, given that this may be detrimental to inertia, they may be formed in the abutment lugs 22.

It is possible to use, in place of balancing rivets, other balancing members which are preferably secured by seaming.

The diaphragm may be mounted pivotally on the cover plate by means of abutment rings which are carried by the fastening lugs 12, or, in a modified version, by means of spacer bars. The clutch may be of the pull-to-release type, the diaphragm then bearing on the cover plate (at its outer periphery), and on the pressure plate.

In place of a diaphragm, the clutch mechanism may of course include coil springs and clutch levers, with the said springs acting between the cover plate and the pressure plate.

A clutch cover having balancing holes (31) for fixing a balancing device. At least one recess (32) is formed in the cover adjacent to one of the balancing holes (31) wherein the recess reduces the local thickness of the cover plate.

We claim:

1. A cover plate for a clutch mechanism made of metal having a thickness, said cover plate comprising balancing holes (31) for the fitting of balancing members (132), wherein at least one recess (32) is formed in the cover plate vicinity of a level with one of said balancing holes (31), the recess (32) reduces a local thickness of the metal and the recess (32) has an oblong form and which is open radially at one end adjacent the balancing hole.

2. A cover plate according to claim 1, wherein the other end of the recess (32) is of semicircular form.

3. A cover plate according to claim 1, wherein the recess is shallow.

4. A cover plate according to claim 1, wherein said cover plate includes, at the level of each balancing hole (31), four recesses (32) which are orientated generally radially and which are spaced apart from each other by 90 degrees.

5. A cover plate according to claim 1, having a generally transversely orientated peripheral flange, with first coplanar portions (2) for fastening the cover plate to a reaction plate (100) of the clutch, wherein the balancing holes (31) with their associated rebates (32) are formed in said flange, in coplanar portions (30) thereof which are offset axially with respect to the first coplanar portions (2).

6. A clutch mechanism comprising a cover plate according to claim 1 (1), a pressure plate (5) coupled in rotation to the cover plate (1) but movable axially with respect thereto, and a diaphragm (6) which is mounted pivotally on the cover plate (1) so as to act on the pressure plate (5).

7. A clutch mechanism according to claim 6 wherein said clutch mechanism includes at least one balancing rivet (132) with a pierced head, and in that said rivet (132) is mounted in the balancing hole (31), being prevented from rotating by the recess (32) associated with the balancing hole (31).

* * * * *